Patented July 18, 1939
2,166,286
UNITED STATES PATENT OFFICE
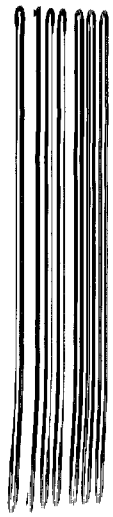

lipoid, the lubricating oil is given an increased oiliness marked by greater strength in the oil film and stability and maintenance of lubricating value under the extreme conditions of modern engine and compressor practice. However, I do not limit the scope of my invention to one percent.

In passing it may be pointed out that by lipoids, I refer to that group of nitrogenous fats which includes lecithins, cholesterins and phosphatides. Specifically, lecithin may be defined as an ester of monoamino glycerophosphoric acid such esters being commonly those of stearic, palmitic, oleic and like fatty acids. The cholesterins are isomers of ergosterol, phytosterol and sitosterol.

Each of the above lipoids is adapted for halogenation for example, with chlorine, bromine or iodine and the products thereof are readily miscible with the usual lubricants such as petroleum oils.

The production of the halogen compounds of the lipoids is of course well understood and need not be outlined here.

As an example of such a halogen compound, it may be stated that lecithin is available either in the very crude state as when obtained from soybean oil by settling, or as it appears on the market in partially purified form. Treatment with chlorine will produce a chlorinated lecithin which may be purified further in any well known manner. Such chlorinated lecithin is dissolved in a motor oil such as produced from petroleum and the result is an increase in the lubricating properties of the oil either for use in an internal combustion engine, gas compressor or wherever there is sliding or rolling contact between the parts of machinery. Examples of this are to be found in the transmission, differential or other gears of the present day automobile particularly, those gears of the hypoid type.

In order to obtain satisfactory results by the addition of halogenated lipoids to the lubricant it is not usually necessary to use more than one percent of this material with the ordinary lubricating oil. The effect of the addition of this material to the oil is to produce what I term an intermolecular lubrication.

This intermolecular lubrication manifests itself by causing the oil and the mechanism to operate at considerably lower temperatures with less bearing wear and consequently much less power consumption. It also manifests itself by much less friction and immensely greater "oiliness" and greater film strength when tested on any of the test machines used for this purpose. For example, an ordinary mineral oil adapted for use in the commercial automobile engine, when tested on the Almen type of testing machine will show a film strength of 10,000 to 20,000 pounds per square inch. By adding to the same oil two percent of chlorinated lecithin the film strength will rise to 80,000 pounds per square inch on this same machine without rupture of the film and without production of any appreciable amount of frictional heat.

Like tests on other types of test machines such as the Timken, Cornell, or Faville-Lavalle machines give equally favorable comparisons.

This intermolecular lubricant for lubricating oils is also produced satisfactorily by starting from one of the cholesterins above mentioned or by the use of a phosphatide and halogenating the same. In like manner the halogen may be supplied as well by bromine or iodine as by the addition of chlorine. While I have suggested the use of two percent of such a compound there are circumstances and conditions under which a lesser proportion is effective and satisfactory.

The essential characteristic of this invention is the addition to ordinary lubricating oils of a minor percentage of a halogenated lipoid. The resulting lubricant is marked by the greatly increased property of oiliness and the lubricant is stabilized and maintained in effective condition over a longer period of time. The new lubricant is capable of use over a wider range of operating temperatures, resists dilution from the fuel or decomposition during the ignition of the latter.

The above are preferred examples but this invention may also be carried out with modifications and substitutions in materials and proportions within the scope of the following claims.

What I claim as my invention is:

1. A lubricant comprising a lubricating oil and a halogenated lipoid.
2. A lubricant comprising a lubricating oil and a halogenated lecithin.
3. A lubricant comprising a lubricating oil and a chlorinated lipoid.
4. A lubricant comprising a lubricating oil and a chlorinated lecithin.
5. A lubricant comprising a lubricating oil and a brominated lecithin.
6. A lubricant comprising a lubricating oil and an iodated lecithin.
7. A lubricant comprising a lubricating oil and a halogenated phosphatide.
8. A lubricant comprising a lubricating oil and a chlorinated ester of monoamino glycerophosphoric acid.
9. A lubricant comprising a lubricating oil and a brominated phosphatide.
10. A lubricant comprising a lubricating oil and an iodated phosphatide.

ROBERT B. DENHAM.